United States Patent
Vogl et al.

(10) Patent No.: US 10,711,470 B2
(45) Date of Patent: Jul. 14, 2020

(54) CLIMBING FORMWORK AND METHOD FOR ERECTION OF A CONCRETE STRUCTURE

(71) Applicant: DOKA GMBH, Amstetten (AT)

(72) Inventors: Simon Vogl, Linz (AT); Peter Amon, Amstetten (AT); Friedrich Steininger, Leonding (AT)

(73) Assignee: DOKA GMBH, Amstetten (AT)

( * ) Notice: Subject to any disclaimer, the term of this patent is extended or adjusted under 35 U.S.C. 154(b) by 0 days.

(21) Appl. No.: 16/092,179

(22) PCT Filed: Apr. 7, 2017

(86) PCT No.: PCT/EP2017/058330
§ 371 (c)(1),
(2) Date: Oct. 8, 2018

(87) PCT Pub. No.: WO2017/174761
PCT Pub. Date: Oct. 12, 2017

(65) Prior Publication Data
US 2019/0145111 A1     May 16, 2019

(30) Foreign Application Priority Data

Apr. 8, 2016 (EP) .................................... 16164402
Nov. 15, 2016 (EP) .................................... 16198919

(51) Int. Cl.
*E04G 11/28* (2006.01)
*E04G 11/32* (2006.01)
(Continued)

(52) U.S. Cl.
CPC .............. *E04G 11/28* (2013.01); *E04G 11/32* (2013.01); *E04G 17/002* (2013.01); *G01C 1/00* (2013.01); *G01C 15/00* (2013.01)

(58) Field of Classification Search
CPC .......... E04G 11/28; E04G 11/30; E04G 11/32
(Continued)

(56) References Cited

U.S. PATENT DOCUMENTS 5,841,353 A * 11/1998 Chisholm ................ G01C 9/00
340/689
8,708,100 B2    4/2014 Schwoerer
(Continued)

FOREIGN PATENT DOCUMENTS

DE     102005030336 A1    1/2007
EP        1806559 A1    7/2007
(Continued)

OTHER PUBLICATIONS

ISA European Patent Office, International Search Report and Written Opinion Issued in Application No. PCT/EP2017/058330, May 10, 2017, WIPO, 10 pages.

*Primary Examiner* — Michael Safavi
(74) *Attorney, Agent, or Firm* — McCoy Russell LLP

(57) ABSTRACT

A climbing formwork and a method for erection of a concrete structure by successively casting a plurality of casting segments, the climbing formwork comprising a first form element for delimiting a cavity to receive concrete for forming an uppermost casting segment, the first form element having upper and lower ends, a support structure to support the first form element, a tilt sensor for measuring a tilt of the first form element, a measuring unit for measuring a horizontal distance between the lower end of the outer surface of the first form element and the upper end of the outer surface of the previous casting segment, a processing unit communicating with the tilt sensor and the measuring unit for calculating a target tilt of the first form element, the processing unit further for determining a deviation between the actual tilt and the target tilt of the first form element.

14 Claims, 15 Drawing Sheets

(51) Int. Cl.
*E04G 17/00* (2006.01)
*G01C 1/00* (2006.01)
*G01C 15/00* (2006.01)

(58) Field of Classification Search
USPC ........ 264/32, 33, 34; 425/63, 65; 249/19, 20
See application file for complete search history.

(56) References Cited

U.S. PATENT DOCUMENTS

| | | |
|---|---|---|
| 2003/0034576 A1 | 2/2003 | Russell |
| 2008/0224022 A1* | 9/2008 | Kreiner ................... E04G 11/22 249/192 |
| 2009/0041879 A1* | 2/2009 | Baum ..................... E04G 11/22 425/63 |
| 2010/0038518 A1 | 2/2010 | Schwoerer |

FOREIGN PATENT DOCUMENTS

| | | |
|---|---|---|
| JP | 3011258 B2 | 2/2000 |
| JP | 2000314235 A | 11/2000 |
| WO | 2011127970 A1 | 10/2011 |
| WO | 2013110126 A1 | 8/2013 |

* cited by examiner

CLIMBING FORMWORK AND METHOD FOR ERECTION OF A CONCRETE STRUCTURE

CROSS-REFERENCE TO RELATED APPLICATIONS

The present application is a U.S. National Phase of International Patent Application Serial No. PCT/EP2017/058330 entitled "CLIMBING FORMWORK AND METHOD FOR ERECTION OF A CONCRETE STRUCTURE," filed on Apr. 7, 2017. International Patent Application Serial No. PCT/EP2017/058330 claims priority to European Patent Application No. 16164402.6, filed on Apr. 8, 2016, and European Patent Application No. 16198919.9 filed on Nov. 15, 2016. The entire contents of each of the above-cited applications are hereby incorporated by reference in their entirety for all purposes.

TECHNICAL FIELD

The present invention relates to a climbing formwork for erection of a concrete structure by successively casting a plurality of casting segments.

BACKGROUND

In the prior art, climbing formworks are used to erect a concrete structure, for example a skyscraper, in a number of successive casting steps. Such climbing formworks may be relocated between casting steps or can move upwards on their own. The latter type is usually referred to as a self-climbing formwork. Examples are shown in US 2010/0038518 A1 or WO 2013/110126 A1. Another type of climber formwork is disclosed in WO 2011/127970.

EP 1 806 559 discloses a surveying procedure for a high-rise building subject to tilt effects and hampered use of ground-level reference points. The system uses at least three receivers of a satellite-based positioning system in order to determine the positions of three reference points, equipped with reflectors, on the uppermost level of the building under construction. The reference points that have been ascertained via the receivers are localized with an electro-optical geodesic instrument associated with the structure. In this way the position of the instrument relative to the three reference points can be acquired, and the instrument is referenced to the absolute coordinate system of the satellite-based positioning system. Furthermore, a tilt of the structure is determined gravimetrically, with a tilt sensor positioned on the uppermost construction level. Further gravimetric tilt sensors may be provided on different construction levels. The measurements are used for matching the geodesic instrument to a coordinate system that dynamically depends on the tilt of the building. However, the prior art of EP 1 806 559 is restricted to the determination of a central axis of the building during erection. This would be insufficient to identify the correct position of the formwork.

In the prior art, it is further known to compare discrete measurements of the previous casting segment as built with the construction plan of the building for the purpose of deriving correction values for the next casting segment. For example, at least two reference positions of each wall of the previous casting segment may be measured. In the next step, a geodesist calculates a multitude of correction values for the coming casting segment based on the deviations of the previous casting segment from the intended arrangement. In the preparation of the casting step, the formwork is adjusted such that the correction values are accounted for in the formation of the uppermost casting segment.

In the prior art, it was necessary for the operators of the climbing formwork to control the position of the upper end of the formwork, as it may not be possible to accurately arrange the lower end of the formwork in a defined casting position. For adjusting the upper end of the formwork, a laser plumb tool may be arranged on the working platform of the climbing formwork. The operator may then check the horizontal distance between the laser radiation from the laser plumb tool and the upper edge of the formwork. However, this adjustment is cumbersome, time-consuming and prone to errors.

Thus, there is a need for enhanced surveying and adjustment procedures during erection of concrete structures in view of minimizing efforts for manual measurements.

On the other hand, JP 2000314235 A discloses a method and a device for controlling a slip form capable of rapid measurement and operation. A plurality of reference points are provided on a slip form to form a placement space of the designed shape while sliding a concrete to be placed, and a target plate is fixed to each reference point. When the reference point is at the specified horizontal position in the designed shape, a perpendicular laser beam is emitted from the ground to pass the reference point on the target plate. The displacement vector from the reference point to the intersection of the target plate with the perpendicular laser beam is detected by a camera fixed to the slip form. The measured shape of the slip form and the difference between the measured shape and the designed shape are calculated based on the displacement vector at a plurality of reference points. An operation output to minimize the difference is calculated, and the slip form is operated by a hydraulic jack according to the operation output.

This prior art attempts to adjust the position of the formwork with respect to laser plummets arranged on the ground. This method entails a number of drawbacks. First, the laser plummet has a maximum reach that possibly is not sufficient for high-rise buildings. Second, the path of the laser emitted from the plummet could be affected by temperature differences or movements of the building across the levels of the concrete structure. Third, the target plates need to be in the field of view of the laser plummet on the ground. This may be impossible to realize with state of the art formworks. Also, concrete structures whose layout varies with height will preclude the possibility of arranging the laser plummet on the ground and determine an absolute formwork position.

It is therefore an object of the invention to alleviate some or all of the drawbacks of the prior art and to propose a climbing formwork and a method for erection of a concrete structure that facilitates adjustment of the formwork before casting.

This object is met by providing a climbing formwork for erection of a concrete structure by successively casting a plurality of casting segments, and a method for erecting the concrete structure by successively casting a plurality of casting segments.

Thus, the climbing formwork of the instant invention comprises at least a first form element with an outer surface for delimiting a cavity to receive concrete for forming an uppermost casting segment, the first form element having an upper end and a lower end, a first support structure to support the first form element, a first tilt sensor for measuring a tilt of the first form element, a first measuring unit for measuring a horizontal distance between the outer surface at the lower end of the first form element and an outer surface at an upper end of a previous casting segment, the outer surface at the upper end of the previous casting segment facing the outer surface of the first form element.

a processing unit communicating with the first tilt sensor and the first measuring unit, the processing unit being arranged for calculating a target tilt of the first form element using the measurement of the horizontal distance between the lower end of the outer surface of the first form element and the upper end of the outer surface of the previous casting segment, the processing unit further being arranged for determining a deviation between an actual tilt and the target tilt of the first form element.

For bringing the first form element into a casting position, the first form element is tiltable and movable at least in a horizontal direction. The first form element is mounted on a first support structure, which preferably comprises a working platform. In the invention, the first tilt sensor is adapted for measuring the tilt, i.e. the inclination with respect to a vertical plane, of the first form element. In the preparation of the present casting step, the first form element may be moved into a casting position, in which the lower end of the first form element is brought into contact with the upper end of the casting segment of the previous casting step. However, due to obstacles in the pathway of the first form element or due to other reasons it may not be possible to press the lower end of the first form element against the previous casting segment such that a gap may be formed between sections of the lower end of the first form element and sections of the upper end of the previous casting segment. Such gap may have a width (i.e. a horizontal extension) of several millimeters or may even range to one centimeter. For larger gaps the casting would be impossible due to concrete leaking from the cavity. It may not be possible to clear the obstacle in the pathway of the first form element. In this case, the casting segment has to be formed while the lower end of the first form element is at least partially out of contact with the upper end of the previous casting segment. The processing unit is arranged for determining the gap between the lower end of the first form element and the upper end of the previous casting segment taking into account the measurement provided by the first measuring unit. In the next step, the processing unit calculates a target tilt of the first form element such that the upper end of the first form element is in a target horizontal position. Preferably, the target horizontal position of the upper end of the first form element is predetermined by a surveyor, in particular a geodesist, for the casting segment to be in conformity with a building plan. Thus, the relative position of the lower end of the first form element and the upper end of the previous casting segment is used as an input to the calculation of the target tilt of the first form element in preparation of the next casting step. Thus, the climbing formwork of the instant invention monitors the horizontal position of the lower end of the first form element with respect to the upper end of the previous casting segment (i.e. the casting segment of the level of the concrete structure directly below the uppermost casting segment) for adapting the tilt of the first form element accordingly.

While JP 2000314235 A adjusts a formwork with respect to measuring devices on the ground, the invention provides for an iterative approach, in which the first form element is adjusted with respect to the casting segment below the cavity for casting the uppermost casting segment.

In this way, the accuracy of the positioning of the first form element in the casting position may be significantly improved. It is made easier to compensate for deviations of the previous casting segment from the construction plan. By measuring both the tilt and the horizontal distance between the lower end of the first form element and the previous casting segment, the workers involved in the erection of the building may be liberated from the laborious and dangerous task of manually controlling the horizontal position of the upper end of the first form element when positioning the first form element in the casting position.

This procedure may be repeated several times for erecting a plurality of casting segments giving rise to a multilevel concrete structure. It is an advantage of the invention that the positioning of the first form element is done relative to the casting segment of the previous casting step.

Preferably, the first measuring unit is arranged at the lower end of the first form element, wherein preferably at least two first measuring units are arranged in a distance from one another in a horizontal direction transverse to a translational displacement of the first form element into a casting position. In this way, a gap formed between the first form element and the previous casting segment may be easily and reliably detected such that the tilt of the first form element may be adjusted accordingly.

In a preferred embodiment, the first measuring unit comprises a wave transmitting and receiving device. This embodiment yields accurate results, dispenses with movable parts and avoids wear even under intense use.

In a first preferred variant, the wave transmitting and receiving device is a laser distance sensor, preferably based on laser triangulation. The laser distance sensor may comprise a laser, optionally a transmitter lens, optionally a receiver lens and a light receiving element.

In a second preferred variant, the first measuring unit comprises an ultrasonic wave transmitting and receiving device. The ultrasonic wave transmitting and receiving device may comprise an ultrasonic element for emitting an ultrasonic wave and receiving a reflection of the ultrasonic wave.

In a particularly simple alternative, the first measuring unit comprises a contact element, preferably a pin, moveable relative to the first form element from a first position into a second position when the first form element is moved into a casting position. In the first position, the contact element extends beyond the plane of the outer surface of the first form element. Preferably, the first measuring unit comprises a spring element which biases the contact element in direction of the first position. For example, the contact element may comprise a pin which is moved from the first (rest) position into the second (withdrawn) position when pressed against the upper end of the previous casting segment. Preferably, the first measuring unit further comprises an encoder, particularly a magnetic or optical encoder, for measuring a position of the contact element, which can be communicated to the processing unit. In a preferred variant, the encoder detects a linear shift, preferably in a substantially horizontal direction, of the contact element when the first form element is brought in abutment with the outer surface of the previous casting segment. When arranging the first form element in the casting position, the contact element is moved from the first (rest) position into the second (fully withdrawn) position, if the horizontal distance between the lower end of the first form element and the upper end of the previous casting segment is substantially zero. However, if there is a gap between the lower end of the first form element and the upper end of the previous casting segment due to obstacles in the path of the first form element the contact element is moved to a partially withdrawn position between the first position and the second position. Thus, the movement of the contact element when the first form element approaches the casting position is indicative of the formation of a gap between the lower end of the first form element and the upper end of the previous casting segment. The data from the first measurement unit is then communicated to the processing unit for calculating a target tilt of the first form element.

In a preferred embodiment, the first measuring unit comprises a sensor housing having a front surface facing the cavity, the front surface being set back against the outer surface of the first form element. Thus, the front surface of the housing of the first measuring unit is spaced from the outer surface of the first form element in horizontal direction away from the cavity for receiving concrete. In this way, the first measuring unit does not interfere with bringing the first form element in abutment with the upper end of the previous casting segment.

In a preferred embodiment, the first measuring unit, preferably also the processing unit, are mounted on the first form element, while the first support structure is free from components of the first measuring device. This arrangement is particularly simple. Also, the first form element may be delivered to the construction site fully equipped with the measuring device.

In another preferred embodiment, the first measuring unit for measuring a horizontal distance between the lower end of the outer surface of the first form element and the upper end of the outer surface of the previous casting segment is arranged for measuring a horizontal displacement of the lower end of the first form element with respect to the first support structure.

Thus, the first measuring unit of this embodiment is provided for determining the horizontal displacement of the lower end of the first form element with respect to a stationary reference point of the first support structure (i.e. with a reference point not movable with the first form element). The first measuring unit may also be arranged for determining a vertical displacement of the first form element with respect to the stationary reference point of the first support structure. Preferably, the stationary reference point is located at the working platform of the first support structure. In this embodiment, the processing unit is arranged for determining the gap between the lower end of the first form element and the upper end of the previous casting segment taking into account the measurement of the horizontal displacement of the lower end of the first form element with respect to the first support structure. For the purpose of calculating the displacement of the first form element, the processing unit may use additional information stored in a data storage unit connected to the processing unit. Such additional information may relate to the arrangement of the first support structure with respect to the previous casting segment and/or to the dimensions of the first form element. In the next step, the processing unit calculates a target tilt of the first form element such that the upper end of the first form element is in a target horizontal position. Preferably, the target horizontal position of the upper end of the first form element is predetermined by a surveyor, in particular a geodesist, for the casting segment to be in conformity with a building plan. Thus, the relative position of the lower end of the first form element and the upper end of the previous casting segment is used as an input to the calculation of the target tilt of the first form element in preparation of the next casting step. Thus, the climbing formwork of the instant invention monitors the horizontal position of the lower end of the first form element with respect to the upper end of the previous casting segment for adapting the tilt of the first form element accordingly. In this way, the accuracy of the positioning of the first form element in the casting position may be significantly improved. It is made easier to compensate for deviations of the previous casting segment from the construction plan. By measuring both the tilt and the horizontal displacement of the lower end of the first form element, the workers involved in the erection of the building may be liberated from the laborious and dangerous task of manually controlling the horizontal position of the upper end of the first form element when positioning the first form element in the casting position.

For the purposes of the present disclosure, the positional and directional indications, like "lower", "upper", "horizontal" and "vertical", refer to the arrangement of the climbing formwork in use when erecting the building.

In a particularly preferred embodiment, the first measuring unit comprises a first reference element arranged on the first support structure and a second reference element arranged on the first form element. When the first form element is moved to the casting position, the second reference element fixed to the first form element is moved relative to the first reference element fixed to the first support structure. The first measuring unit is arranged for measuring the horizontal distance between the first and second reference element, which is indicative of the position of the lower end of the first form element relative to the upper end of the previous casting segment. Thus, the processing unit receiving the measurements from the first measuring unit may determine the width of the gap between the lower end of the first form element and the upper end of the casting segment of the previous casting step. The tilt of the first form element may then be adjusted accordingly.

For obtaining reliable, accurate positional information about the lower end of the first form element relative to the previous casting segment, the first measuring unit preferably comprises an optical device, in particular a camera, the optical device being arranged for locating the first reference element on the first support structure and the second reference on the first form element, respectively. The first and second reference element is located in the field of view of the optical device, respectively. The processing unit is arranged for calculating a horizontal distance between the first and second reference element from the data provided by the optical device. In a particularly preferable embodiment, the optical device is a camera arranged for obtaining a picture including the first and second reference element. In this case, the processing unit may include an image processing unit, as is per se known in the art, to derive the horizontal distance between the first and second reference element from the picture taken by the camera.

In a preferred embodiment, the first and second reference element comprises a first and second barcode element, respectively. The optical device may be used to determine the center points of the first and second barcode element. The first and second barcode element may also have a unique first and second identification code. The measuring unit and the processing unit may be arranged for reading out the first and second identification code. Preferably, two-dimensional matrix barcode elements are used, known as QR (Quick Response) Codes.

For facilitating the measurement of the horizontal displacement of the lower end of the first form element, the second reference element is preferably arranged at the lower end of the first form element.

In a preferred embodiment, the optical device and/or the tilt sensor are arranged on the first form element.

In a preferred embodiment, the processing unit is arranged for comparing the horizontal displacement of the second reference element with respect to the first reference element with a horizontal distance between an outer surface of a previous casting segment and the first reference element, the processing unit further being arranged for calculating a gap between the first form element and the outer surface of the previous casting segment. Due to obstacles in the path of the first form element between a withdrawn position and a casting position, a gap may extend between facing outer surfaces of the first form element and the previous casting segment. By measuring the horizontal displacement of the lower end of the first form element the gap may be measured and accounted for in the calculation of the target tilt of the first form element.

In a further preferred embodiment, a third reference element is arranged on the first support structure, the third reference element being arranged in a distance from the first reference element in a direction away from the cavity, the optical device being arranged for locating the third reference element. In this embodiment, the first form element may be easily arranged in a defined withdrawn position, which facilitates the positioning of reinforcements before the first form element is moved into the casting position.

In a particularly preferred embodiment, the processing unit is arranged for calculating a deviation between the actual horizontal position of the first form element and a target withdrawn position of the first form element using the location of the third reference element. Thus, the third reference element is arranged further away from the cavity in comparison to the first reference element. By monitoring the horizontal distance between the third reference element fixed at the first support structure element and the second reference element movable with the first form element, preferably by means of the optical device mentioned above, the first form element may be easily arranged in a defined withdrawn position, which is spaced apart from the casting position. This withdrawn position may be used for arranging the reinforcements in the cavity before the first form element is brought into the casting position, in which the first form element delimits the cavity for receiving concrete. The deviation of the first form element from the withdrawn position may be shown on the display device, signaled by the signal device and/or used as an input for the drive unit connected to the processing unit, respectively.

In a preferred embodiment, in the withdrawn position of the first form element a distance piece for a reinforcement of the casting segment to be cast projects from the first form element. In this way, the reinforcement may be easily arranged in the space intended to receive concrete in the casting step, while the first form element is in the withdrawn position. Due to the distance piece, the reinforcements may be prevented from extending beyond their intended position. Preferably, the withdrawn position is spaced from the casting position such that the reinforcements are in contact with the distance holder when the first form element is in its withdrawn position. After the positioning of the reinforcements is completed, the distance holder may be removed such that the first form element may be safely moved into the casting position, without danger of a collision with the reinforcements previously arranged. Thus, any damages of the first form element and its first support structure may be prevented.

Preferably, the distance piece is mounted on the first form element. In the withdrawn position, the distance piece preferably extends essentially perpendicularly to the main plane of the first form element. In a preferred embodiment, the distance piece is pivotably connected to the first form element, preferably at the upper end thereof. In this case, the distance piece may be pivotable between a stowed position for the casting position of the first form element and an operating position for the withdrawn position of the first form element. In the operating position, the distance piece projects from the first form element in direction of the space for arranging the reinforcements. In an alternative embodiment, the distance piece may be detachably connected to the first form element.

In a preferred embodiment, the tilt sensor comprises a laser plummet (plumb laser) device, preferably comprising a laser radiation source for emitting a vertical laser beam, a preferably self-leveling support for mounting the laser radiation source thereon, a target plate for receiving the vertical laser beam from the laser radiation source and a camera unit for detecting a displacement of an intersection of the vertical laser beam with the target plate. Preferably, the laser radiation source is mounted on one of the lower or the upper end of the first form element, whereas the target plate, preferably also the camera unit, is mounted on the other of the lower and the upper end of the first form element. This embodiment allows for easy adaptation to different heights of the first form element. Furthermore, the installation and transport of the first form element is facilitated. Also, the laser plummet device may be easily replaced. For achieving accurate and reliable results, it is preferred if the self-leveling support is connected to a dampening device for dampening vibrations of the self-leveling support.

In another preferred embodiment, the tilt sensor comprises a longitudinal element, preferably a measuring rod or a wire or string, mounted on the first form element, the longitudinal element preferably extending from an upper end of the first form element to the lower end of the first form element, the longitudinal element preferably being connected to the first form element at the upper end and at the lower end of the first form element, respectively. This embodiment is particularly advantageous in that the accuracy of the measurement of the inclination of the first form element is significantly increased. In many cases, the shape of the first form element may only be provided with limited precision. In such cases, measuring the tilt of the first form element at an arbitrary position along the length of the first form element would not yield reliable results. In the embodiment mentioned before, this problem may be avoided by connecting the longitudinal element to the first form element at two positions spaced apart from one another, preferably at the upper and the lower end of the first form element. In this case, deformations of the first form element are less detrimental to the tilt measurements.

If the longitudinal element is a wire or string, it is preferred that the wire or string is connected to a tensioning device. This variant is particularly light-weight and reliable. The wire or string may be housed in a hollow element, in particular in a pipe. In this way, the risk of damages to the wire or string is significantly reduced.

If the longitudinal element is a measuring rod, the installation is particularly simple and costs may be reduced.

In this embodiment, it is preferable if the longitudinal element is connected to the first form element via a first pivoting support preferably at the lower end of the first form element and a second pivoting support preferably at the upper end of the first form element. Thus, in this embodiment the longitudinal element is supported, preferably on opposite ends, by a first pivoting or tilting support and a second pivoting or tilting support. In this way, the arrangement of the longitudinal element accurately reflects the inclination of the first form element.

In a particularly preferred embodiment, the processing unit is connected to a data storage unit storing a correction value for a position of the first form element, the correction value being derived from a deviation between a position of a previous casting segment from a reference position of the previous casting segment, the processing unit being arranged for calculating the target tilt of the first form element using the correction value for the position of the first form element in addition to the horizontal distance between the lower end of the outer surface of the first form element and the upper end of the outer surface of the previous casting segment. As is known from the prior art, a multitude of correction values may be derived for individual sections of the casting segment to be casted. Each correction value reflects a deviation of a certain measuring point of the position of the previous casting segment as built, in particular at an upper end thereof, from its reference position, i.e. its intended position as shown in the construction plan. A number of techniques are known for obtaining measuring points of the previous casting segment as built for calculating the correction values therefrom. For example, laser plumb tools may be used. For this reason, detailed explanations thereof may be omitted in this disclosure. However, according to the instant invention the formation of the casting segment is improved by using not only the correction values but also the input from the first measuring unit. In this way, the target tilt of the first form element may be accurately calculated without a need for manually measuring the horizontal position of the upper end of the first form element.

The positioning of the first form element may be improved in several ways based on the determination of the deviation between the actual tilt and the target tilt of the first form element.

In a preferred embodiment, the processing unit is connected to a displaying device for displaying the deviation between the target tilt and the actual tilt of the first form element. In this particularly simple embodiment, the displaying device displays information about the deviation of the first form element from its target position. This information can be used to manually change the inclination of the first form element.

In a further preferred embodiment, the processing unit is connected to a signaling device for signaling the deviation between the target tilt and the actual tilt of the first form element. The signaling device may be arranged for outputting an acoustic or a visual signal.

In a further preferred embodiment, the climbing formwork comprises a drive unit for adjusting the first form element relative to the first support structure, the drive unit preferably comprising a first tilting unit for tilting the first form element and/or a first horizontal displacement unit for horizontally displacing the first form element and/or a first vertical displacement unit for vertically displacing the first form element.

In a further preferred embodiment, the processing unit is connected to the first tilting unit for tilting the first form element in accordance with the target tilt. In this embodiment, the first form element may be adjusted by means of the first tilting unit, in particular by pivoting the first form element about a horizontal pivot axis.

According to the instant invention, the method for erecting a concrete structure by successively casting a plurality of concrete segments comprises the steps of arranging a climbing formwork having at least a first form element in a casting position, wherein the first form element delimits a cavity to receive concrete for forming an uppermost casting segment, supporting the first form element in the casting position, measuring an actual tilt of the first form element, measuring a horizontal distance between the lower end of the outer surface of the first form element and the upper end of the outer surface of the previous casting segment, calculating a target tilt of the first form element using the measurement of the horizontal distance between the lower end of the outer surface of the first form element and the upper end of the outer surface of the previous casting segment, determining a deviation between the actual tilt and the target tilt of the first form element.

In a preferred embodiment, the method further comprises the steps of storing a correction value for a position of the first form element, the correction value being derived from a deviation between a position of a previous casting segment from a reference position of the previous casting segment, calculating the target tilt of the first form element using the correction value for the position of the first form element and the horizontal distance between the lower end of the outer surface of the first form element and the upper end of the outer surface of the previous casting segment.

In a preferred embodiment, the method further comprises at least one of displaying the deviation between the target tilt and the actual tilt of the first form element, signaling the deviation between the target tilt and the actual tilt of the first form element, tilting the first form element in accordance with the target tilt by means of a drive unit.

BRIEF DESCRIPTION OF THE FIGURES

In addition to the aspects, embodiments, and features described above, further aspects, embodiments, and features will become apparent by reference to the figures and the following detailed description.

DETAILED DESCRIPTION

Figure 1:
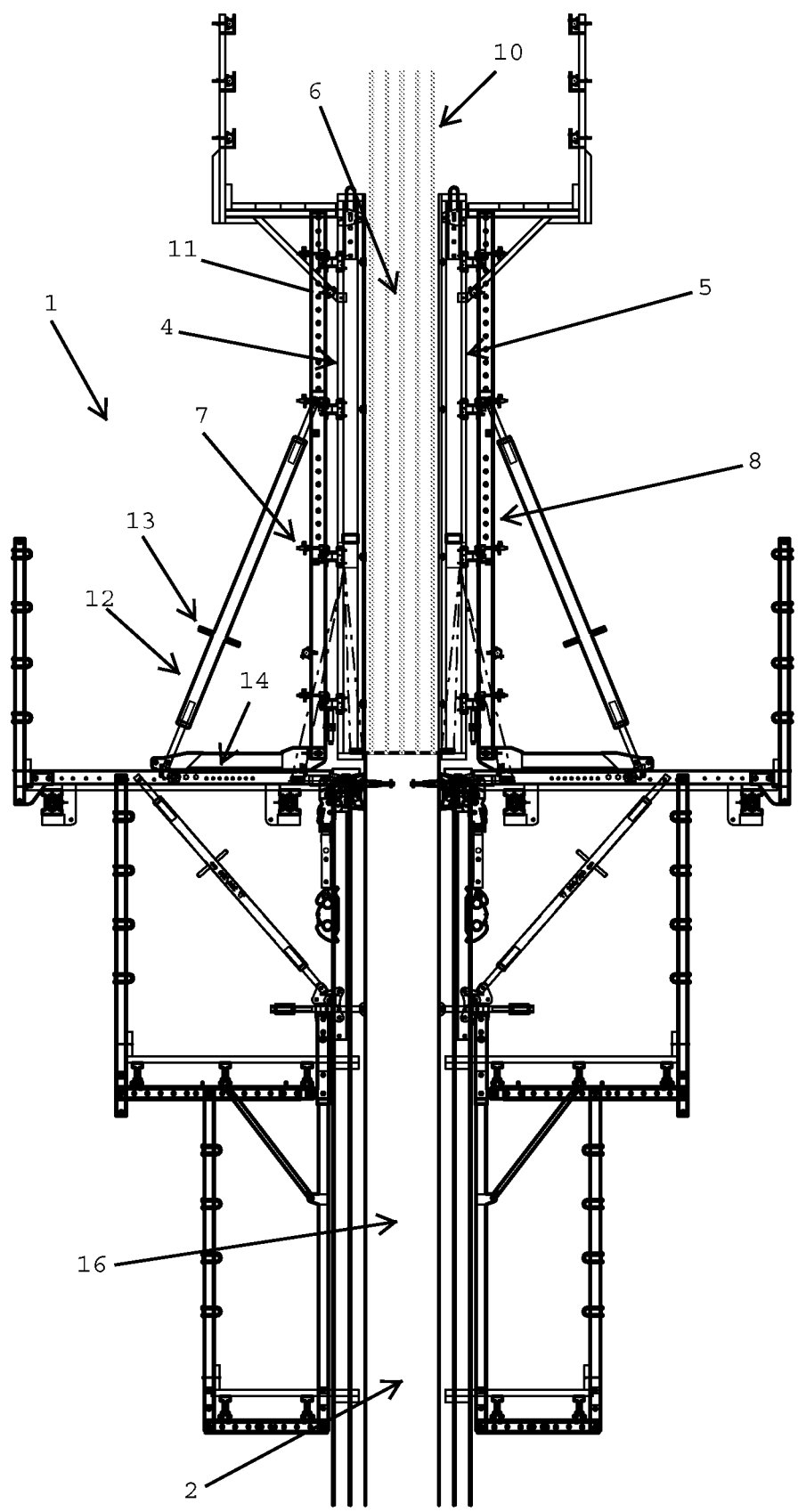
FIG. 1 is a schematic view of a climbing formwork for the progressive erection of a building structure having a first and second form element supported by a first and second support structure, respectively, according to the present invention.

FIG. 1 shows a climbing formwork 1 for progressive erection of a concrete structure 2, for example a skyscraper. The concrete structure 2 is erected in a plurality of casting steps, in which a corresponding number of casting segments 3, each corresponding to a level of the concrete structure 2, are formed. For this purpose, the climbing formwork 1 comprises a first form element 4 and a second form element 5. Each of first 4 and second form element 5 comprises a formwork panel. In a casting position, the first 4 and second form element 5 define a cavity or space 6 therebetween to receive concrete for forming an uppermost casting segment. In detail, an outer surface 4a of first form element 4 is facing the cavity 6, while an inner surface 4b of first form element 4 is facing away from the cavity 6 for receiving concrete. As usual, reinforcements 10 are arranged in cavity 6 between first 4 and second form element 5 before casting of the uppermost casting segment. Reinforcements 10 project upwards of the upper end of first form element 4 and second form element 5. The climbing formwork 1 further comprises a first support structure 7 to support the first form element 4 and a second support structure 8 to support the second form element 5.

In the shown embodiment, a crane may be used to lift the climbing formwork 1 after completion of a casting step. However, as is well known in the prior art, the first support structure 7 may be connected to a first lifting device and the second support structure 8 may be connected to a second lifting device. The first and second lifting device are arranged for lifting the first 4 and second form element 5 in a vertical direction from a first casting position for forming a first casting segment to a second casting position for forming a second casting segment, the second casting segment being arranged on top of the first casting segment. In this way, an automatic or self-climbing formwork is provided.

The climbing formwork 1 will be explained with reference to the first form element 4 and the first support structure 7 (as shown on the left-hand side of FIG. 1). However, it will be understood that the description also applies to the second form element 5 and the second support structure 8 (as shown on the right-hand side of FIG. 1). In any case, the construction of first 7 and second support structure 8 of the shown climbing formwork 1 is conventional so that detailed explanations may be omitted.

The first support structure 7 comprises a support member 11, which is mounted on a drive unit 12 for adjusting the position and orientation of first form element 4 relative to the first support structure 7. In the shown embodiment, the drive unit 12 comprises a first tilting unit 13 for tilting the first form element 4. The tilting unit 13 permits the first form element 4 to be deployed in either of a vertical casting position (see FIG. 2) and an inclined casting position (see FIG. 3). The tilt of the first form element 4 may reflect a correction value with respect to a previous casting segment 16. Furthermore, drive unit 12 comprises a first horizontal displacement unit 14 for moving the first form element 4 into position for casting. Furthermore, drive unit 12 may comprise a first vertical displacement unit for vertically displacing the first form element 4.

In the shown embodiment, the first support structure 7 comprises a working platform 7a for supporting the first form element 4 from below. However, in an alternative embodiment, the first form element 4 is suspended from the first support structure 7. Such suspending formworks are known in the prior art.

The drive unit 12 may comprise any known drives. For example, tilting unit 13 may include a hydraulic plunger and cylinder for tilting first form element 4. Furthermore, horizontal displacement unit 14 may include a carriage mechanism for horizontally displacing first form element 4, as explained in WO 2011/127970. In a less preferred embodiment, the form element 4 is manually adjusted for arrangement in the casting position.

Figure 2:
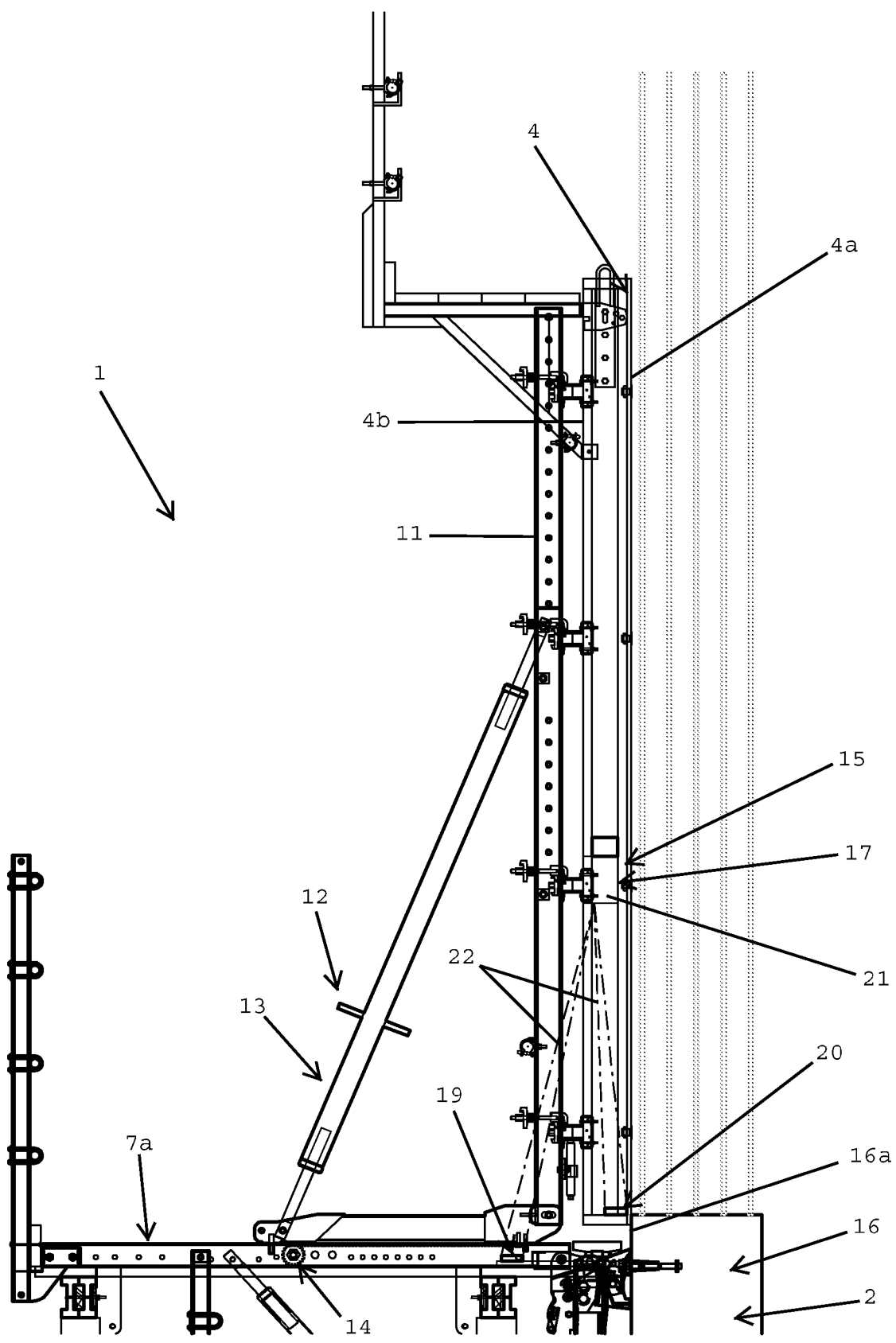
FIG. 2 is an enlarged view of the climbing formwork depicted in FIG. 1, wherein the first form element is arranged in an essentially vertical casting position.
Figure 3:
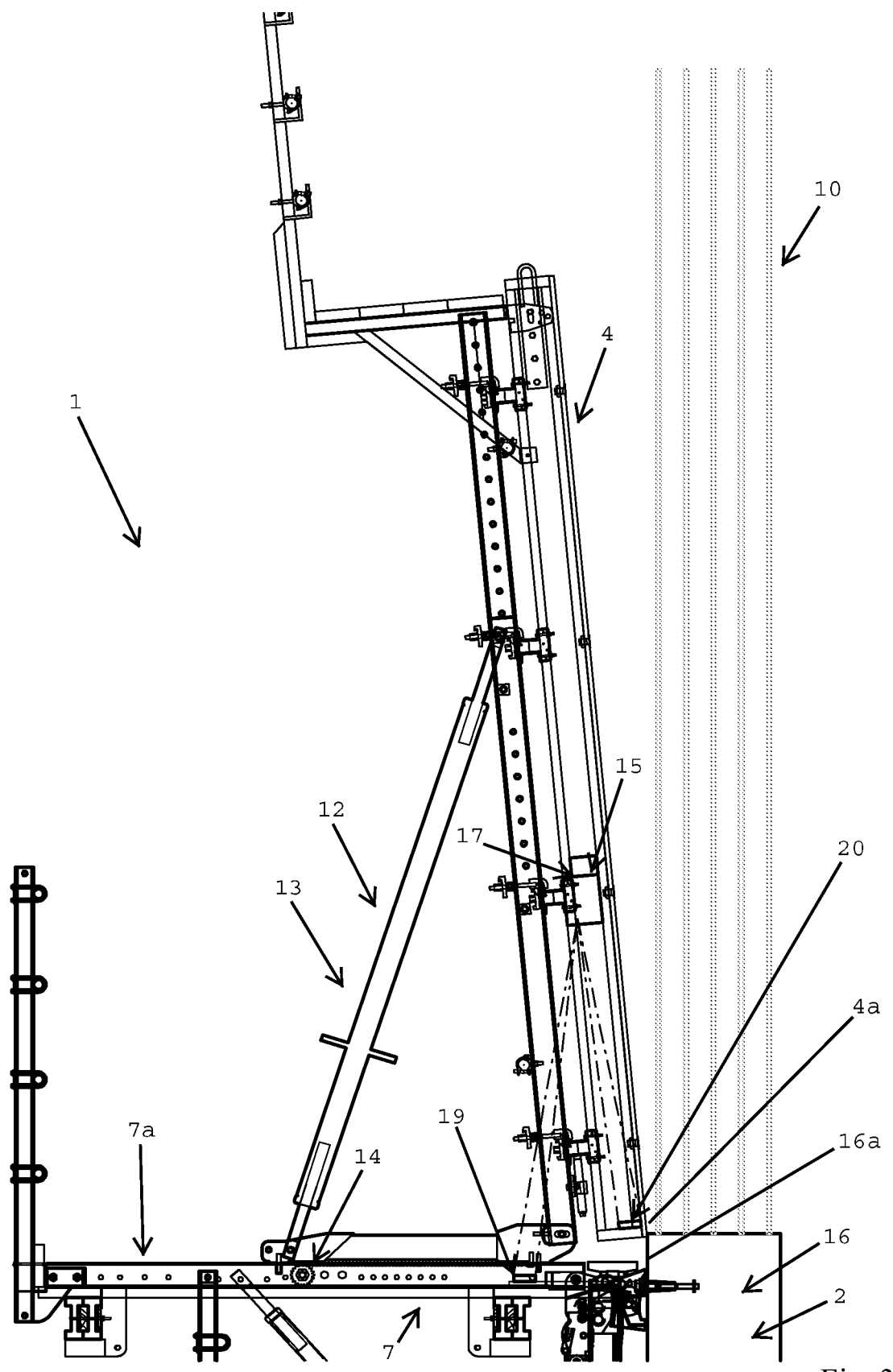
FIG. 3 is a view of the climbing formwork according to FIG. 2, wherein the first form element is arranged in an inclined casting position.
Figure 4:
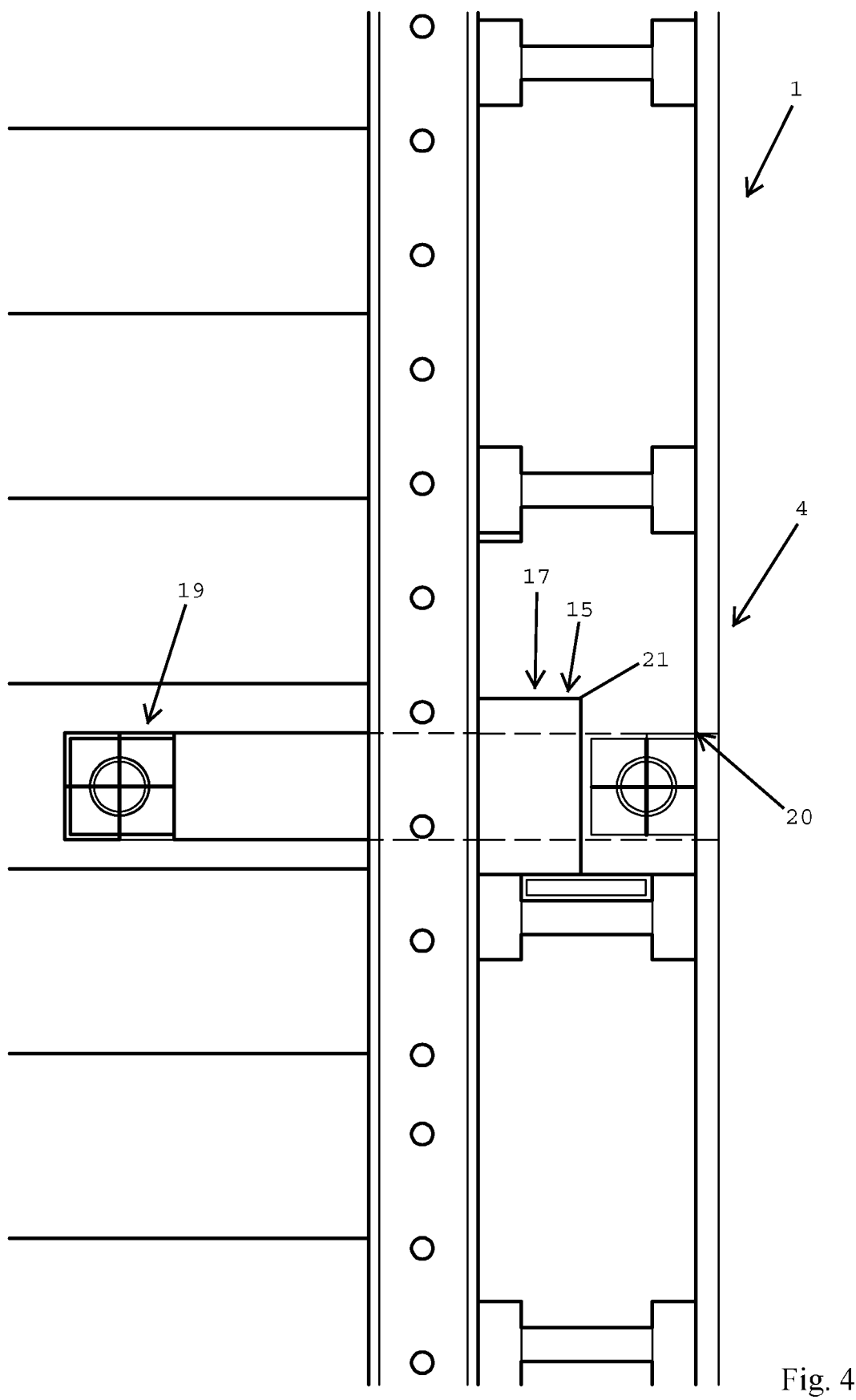
FIG. 4 is a top view of the climbing formwork according to FIGS. 1 to 3.

In the casting position, the lower end of outer surface 4a of first form element 4 rests against the upper end of an outer surface 16a of the previous casting segment 16, i.e. the casting segment directly below the cavity 6 for forming the uppermost casting segment (see FIG. 2). However, due to obstacles in the pathway of first form element 4 it may not be possible to arrange the first form element 4 in the position resting against the previous segment 16. For this reason, the shown embodiment of the climbing formwork 1 is arranged for determining the position of the lower end of the first form element 4 for adjusting the tilt of the first form element 4 such that the upper end of the first form element 4 is arranged in a target horizontal position before casting.

In the shown embodiment, climbing formwork 1 comprises a first tilt sensor 15, also termed inclinometer, for measuring an inclination of the main plane of first form element 4 with respect to a vertical plane. The tilt sensor 15 may be of conventional design and is only schematically illustrated in the drawings. The climbing formwork 1 further comprises a first measuring unit 17 for measuring a horizontal displacement of the lower end of the first form element 4 with respect to a working platform 7a of first support structure 7. A processing unit 18 (see FIG. 6) communicates with the first tilt sensor 15 and the first measuring unit 17, respectively.

The processing unit 18 calculates a target tilt of the first form element 4 based on the input from the first measuring unit 17, which measures the horizontal displacement of the lower end of the first form element (i.e. the end of the first form element 4 adjacent the working platform 7a). On this basis, the processing unit 18 determines a deviation between the actual tilt and the target tilt of the first form element 4.

For determining the horizontal position of the lower end of the first form element 4, the first measuring unit 17 comprises a first reference element 19 stationarily arranged on the first support structure 7 and a second reference element 20 arranged on the first form element 4. The first reference element 19 and the second reference element 20 are arranged in the field of view of an optical device 21 of the first measuring unit 15, as illustrated with dotted lines 22. Preferably, the optical device 21 is a camera capable of capturing images containing both the first reference element 19 and the second reference element 20. The processing unit 18 comprises an image processing unit 23 for determining a horizontal distance between a center point of the first reference element 19 and a center point of the second reference element 20. The first 19 and second reference element 20 preferably comprises a first and second barcode element, respectively. The second reference element 20 is arranged at the lower end of the first form element 4, while the first reference element 19 is arranged on the working platform 7a of first support structure 7. In the shown embodiment, the optical device 21 and the tilt sensor 15 are immovably attached to the first form element 4.

In preparation of the casting of the uppermost casting segment, the processing unit 18 compares the horizontal displacement of the second reference element 20 with respect to the first reference element 19 with the known horizontal distance between the outer surface 16a of the previous casting segment 16 and the first reference element 19. Based on this comparison, the processing unit 18 determines a gap, i.e. a horizontal distance, between the lower end of the outer surface 4a of the first form element 4 and the upper end of the outer surface 16a of the previous casting segment 16. Thus, it is checked whether the first formwork element 4 fully rests against the previous casting segment 16.

The processing unit 18 is further connected to a data storage unit 24 storing a multitude of correction values for the casting segment of the present casting step. The correction values for the casting segment are transformed into correction values for the position of the first form element 4 such that deviations of the previous casting segment 16 as built from the reference position as shown on the construction plan are compensated for in the present casting step. For the adjustment of the first form element 4, the processing unit 18 calculates the target tilt of the first form element 4 using the correction value for the position of the first form element 4 in addition to the measurement of the horizontal displacement of the lower end of the first form element 4.

Figure 6:
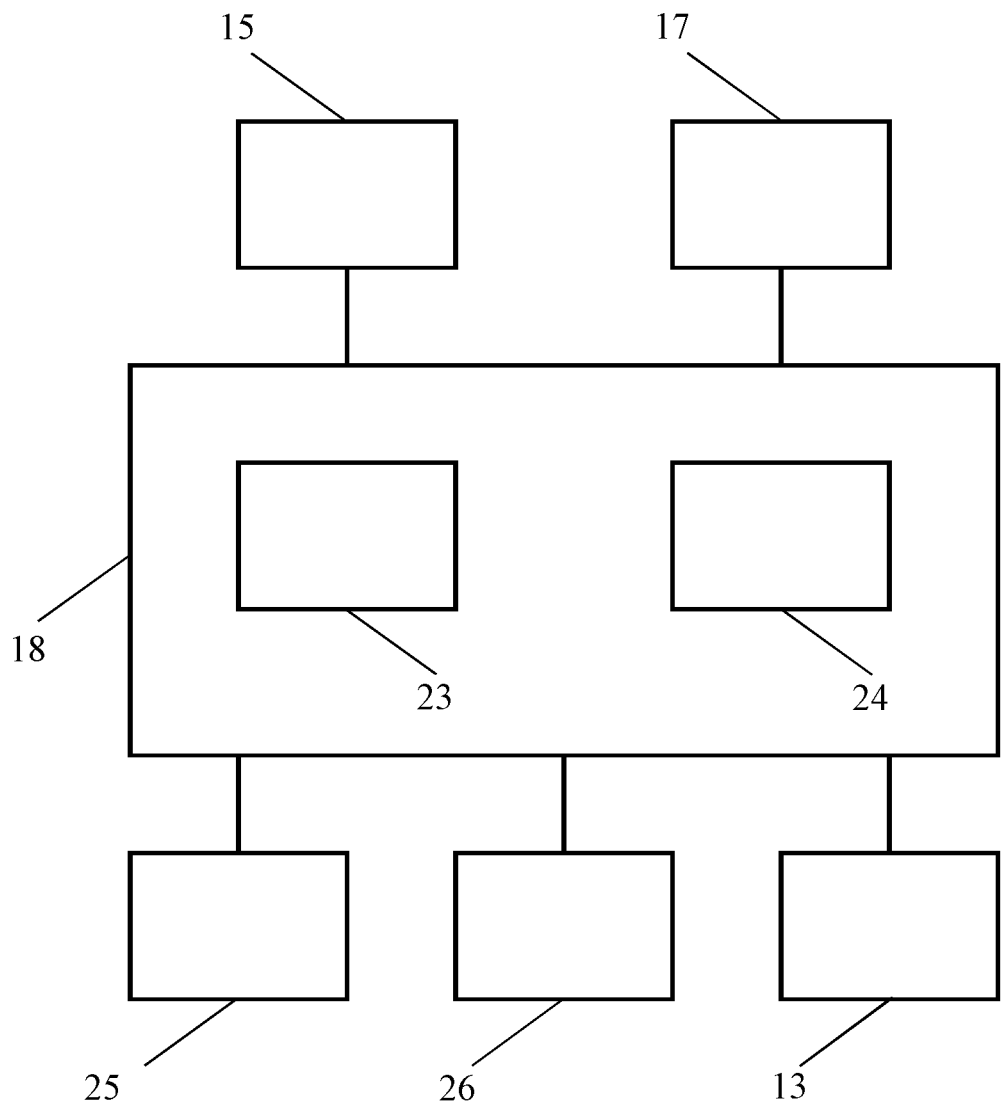
FIG. 6 is a function chart of the climbing formwork of FIGS. 1 to 5.

As can be schematically seen from FIG. 6, the processing unit 18 preferably is connected to a displaying device 25 for displaying the deviation between the target tilt and the actual tilt of the first form element 4. The processing unit 18 may also be connected to a signaling device 26 for signaling the deviation between the target tilt and the actual tilt of the first form element 4. Finally, the processing unit 18 preferably is connected to the first tilting unit 13 of the drive unit 12 for tilting the first form element 4 in accordance with the target tilt.

Figure 5:
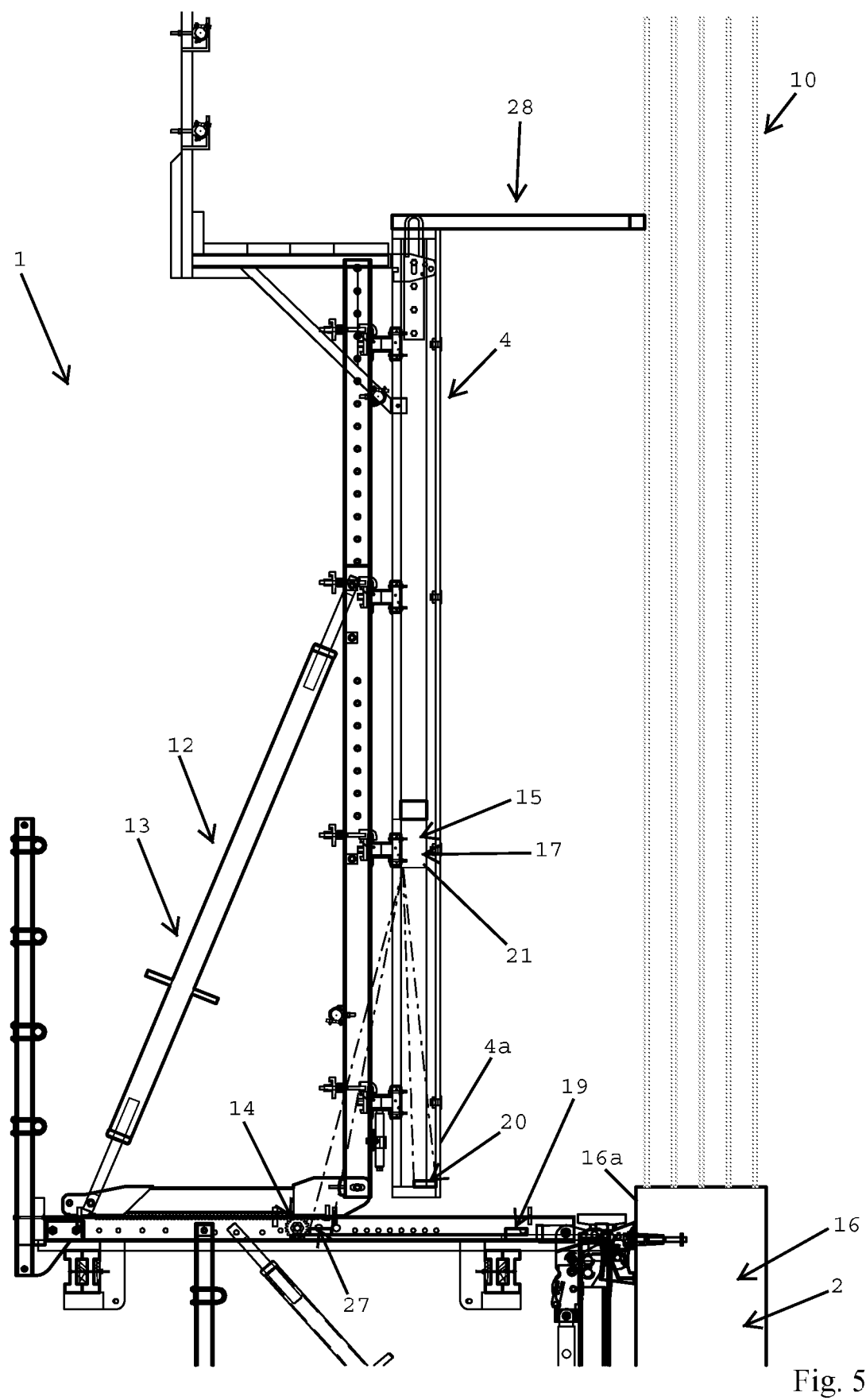
FIG. 5 is a view of the climbing formwork as in FIG. 2, 3, wherein the first form element was moved into a withdrawn position for arranging reinforcements in the cavity for receiving concrete.

FIG. 5 illustrates another embodiment of the climbing formwork 1, in which a third reference element 27 is arranged on the first support structure 7. The third reference element 27 may be a barcode element, in particular a two-dimensional matrix barcode. The third reference element 27 is arranged in a distance from the first reference 19 element in a direction away from the cavity 6. The optical device 21 simultaneously locates the third reference element 27 at the first support structure 7 and the second reference element 20 at the first form element 4. In the same fashion as explained above, the processing unit 18 may determine the horizontal distance between the second 20 and third reference element 27 for arranging the first form element 4 in a defined withdrawn position (shown in FIG. 5), which is spaced from the casting position by a defined horizontal distance.

In this withdrawn position, the reinforcements 10 for the uppermost casting segment may be easily arranged. This is facilitated by a distance piece 28. In the shown embodiment, the distance piece 28 is pivotably mounted at the upper end of the first form element 4. In the withdrawn position of the first form element 4, the reinforcements 10 are brought in contact with the distance piece 28. In this case, it is ensured that the reinforcements 10 will be arranged in their intended position inside the cavity 6 after the distance piece 28 was removed and the first form element 4 moved into the casting position.

Figure 7:
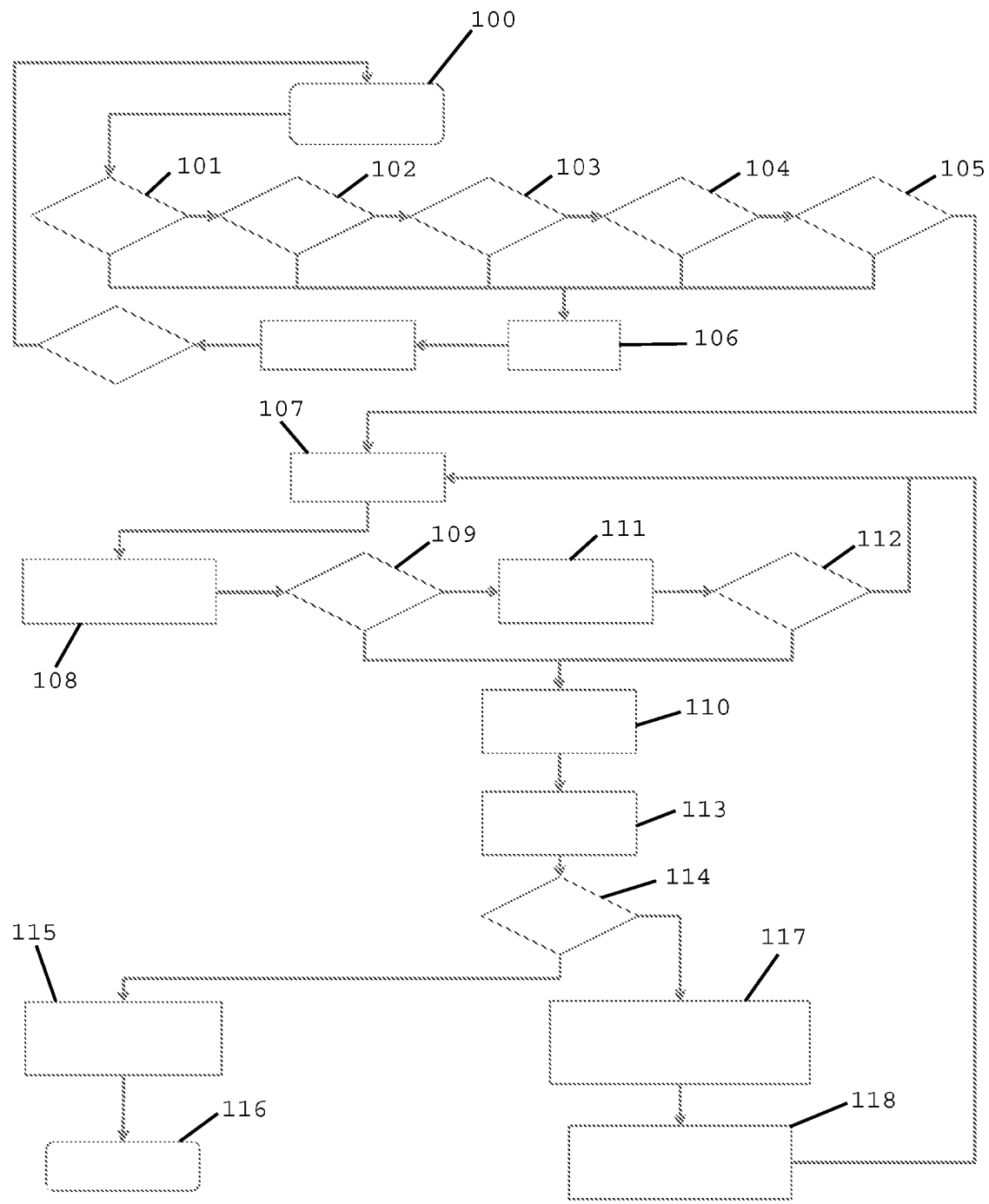
FIG. 7 is a block diagram of a method for erecting a concrete structure by successively casting a plurality of concrete segments according to the invention.
Figure 8:
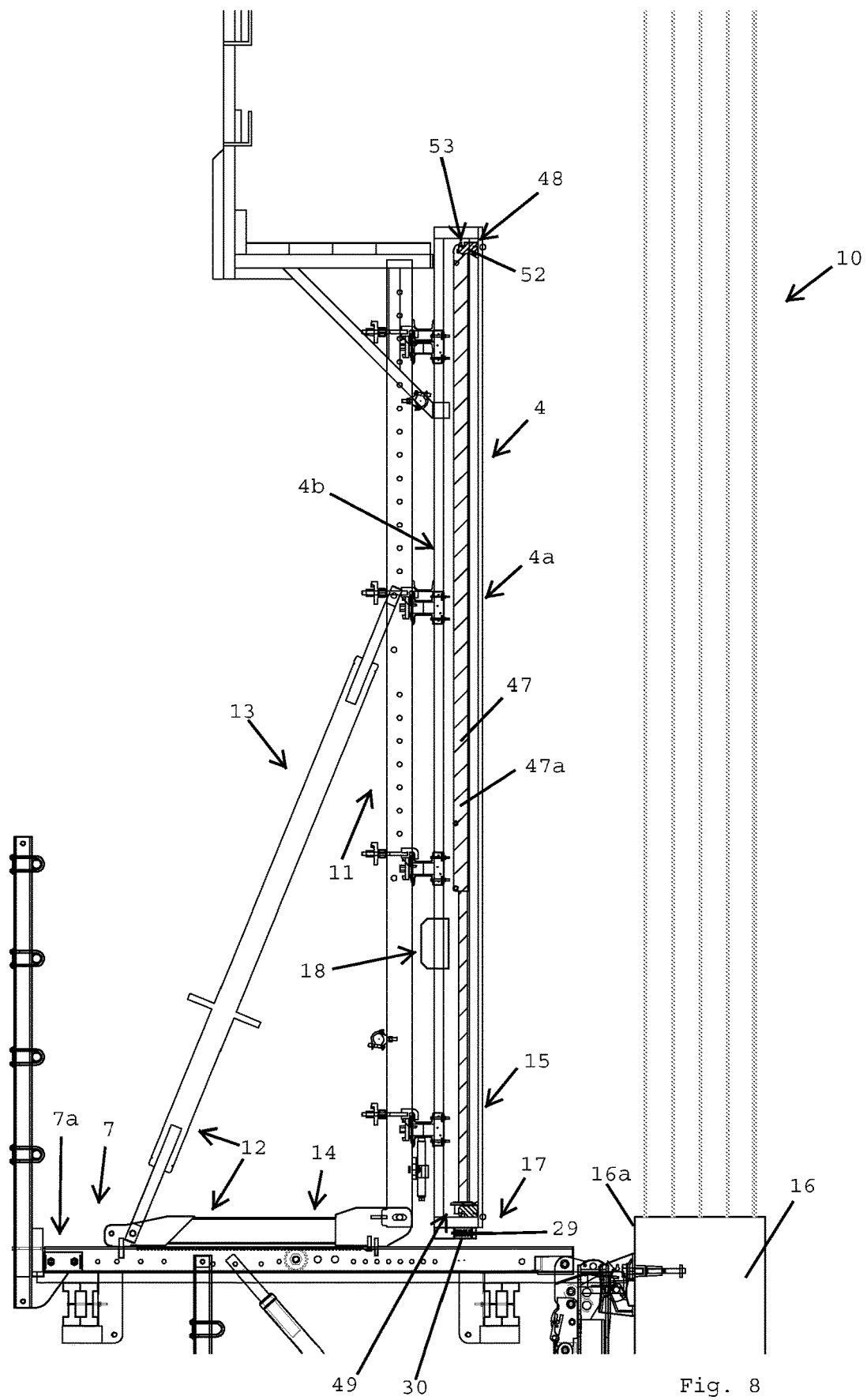
FIG. 8 is a view of a climbing formwork, arranged in a withdrawn position, according to another embodiment of the invention.
Figure 9:
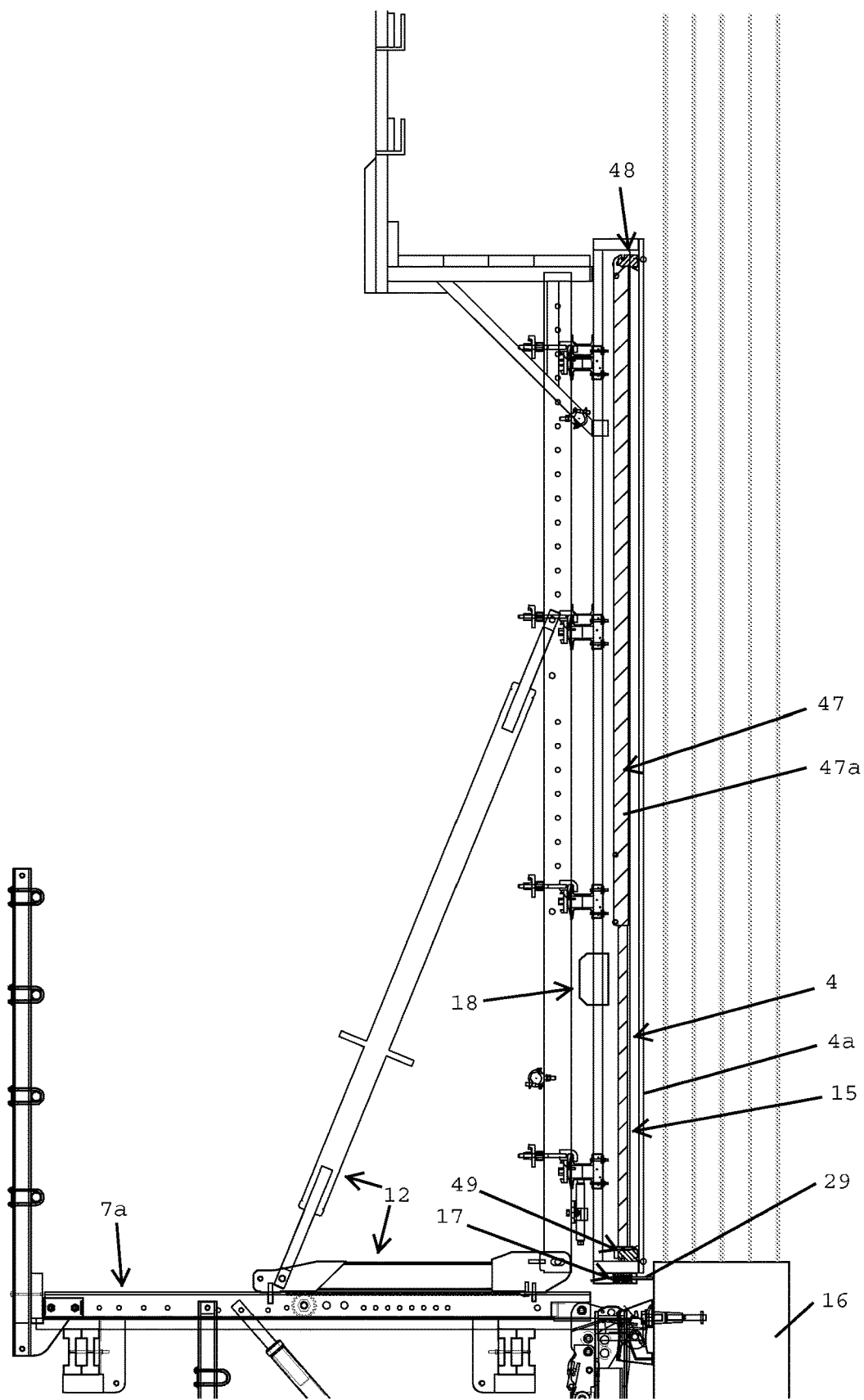
FIG. 9 is a view of the climbing formwork of FIG. 8 when the first form element approaches the previous casting segment.

FIG. 7 shows a flow chart illustrating the adjustment of the climbing formwork 1 in preparation of the casting step. Before the procedure is started the first form element 4 is moved into the casting position by bringing the lower end of the first form element 4 into contact with the upper end of the previous casting segment 16.

At block 100, the measuring and adjustment procedure is started. At the outset, the climbing formwork 1 may run through a number of tests. At block 101, the power of the electronic components of the climbing formwork 1 is checked. At block 102, reference element 19 is located by means of first measuring unit 17. In the same fashion, reference element 20 is located at block 103. At block 104, the availability of a correction value for the present position of first form element 4 in data storage unit 24 is checked. At block 105, the information about the geometry, in particular the height, of the first form element 4 is verified. If any one of these checks fails, an error is returned at block 106. In this case, routines for eliminating the source of the error are followed (block 107), before the checks are repeated (block 108). If the checks at blocks 101 to 105 are completed successfully, the measurement of the horizontal displacement of the lower end of the first form element 4 is initiated (block 107). A control value is derived from the horizontal distance between the second reference element 20 and the first reference element 19 (block 108). The control value is compared to the known distance between the first reference element 19 and the outer surface 16a of the previous casting segment 16 (block 109). If this comparison results in a finding that the first form element 4 is in contact with the previous casting segment 16, the program proceeds to the calculation of the target tilt of the first form element 4 (block 110). If the control value indicates a displacement of the lower end of the first form element 4 from the a position of the first form element 4 resting against the previous casting segment 16, an error message is outputted at displaying device 25 (block 111). The operator may then decide whether the determined misalignment of the first form element 4 in the casting position is acceptable (block 112). If this is affirmed, the program proceeds to the calculation of the target tilt of the first form element 4 at block 110. On the other hand, if the deviation of the position of the first form element 4 exceeds a tolerable threshold, the program may return to step 107. At block 113, the tilt sensor 15 returns an actual tilt of the first form element 4. At block 114, the target tilt of the first form element 4 is compared to the actual tilt of the first form element 4. If the actual tilt of the first form element 4 corresponds to the target tilt, a message indicates the correct positioning of the first form element 4 (block 115) and the procedure is concluded (block 116). In case the actual tilt of the first form element 4 deviates from the target tilt, the displaying device 25 alerts the instructor of the deviation (block 117). The message may contain instructions how to manually adjust the inclination of the first form element 4 such that the target position of the upper end of the first form element 4 is achieved. At block 118, the tilt of the first form element 4 is adjusted manually or by means of the drive unit 12. The procedure then returns to the measurement of the horizontal displacement of the first form element 4 at block 107. This subroutine is repeated until the target tilt of the first form element 4 is achieved (block 114) so that the adjustment of the first form element 4 may be concluded (block 116).

Further embodiments of the invention are shown in FIGS. 8 to 15. In the following, only the relevant differences to the embodiment shown in FIGS. 1 to 7 will be explained.

The embodiments of FIGS. 8 to 15 have in common that not only the first tilt sensor 15 but also all components of the first measuring unit 17 are arranged on the first form element 4. In this way, the measurement of the horizontal distance between the lower end of the outer surface 4a of the first form element 4 and the upper end of the outer surface 16a of the previous casting segment 16 need not be made relative to the working platform 7a.

In FIGS. 8 to 15 variants of the first measuring unit 17 and the tilt sensor 15 are shown. It will be understood by the person skilled in the art that all combinations of the variants of the first measuring unit 17 and the tilt sensor 15, respectively, may be used in the formwork 1.

Figure 15:
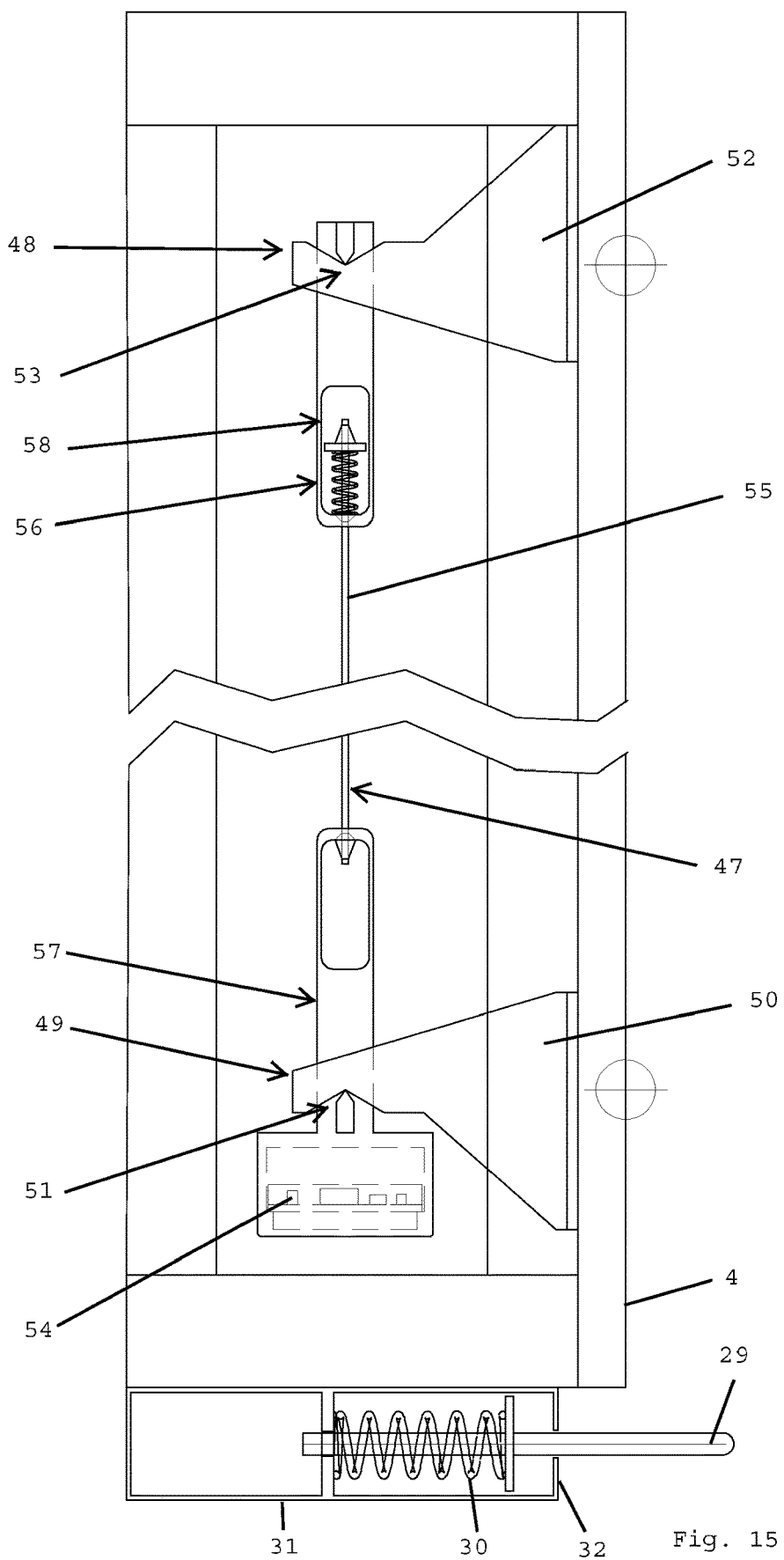
FIG. 15 is a detailed view of the upper and lower end of the first form element according to FIG. 14.

According to the embodiment of FIGS. 8 to 11, the first measuring unit 17 comprises a contact element 29 for abutting on the upper end of the outer surface 16a of the previous casting segment 16 (for details of this measuring unit 17 see FIG. 15). The contact element 29 is moveable relative to the first form element 4 when the first form element 4 is brought into the casting position. In the shown embodiment, the contact element 29 comprises a pin which may be pressed against the upper end of the previous casting segment 16. The first measuring unit 17 further comprises an encoder, for example a magnetic encoder, for providing a position of the contact element 29 relative to the first form element 4. The encoder is connected to the processing unit 18 which is arranged on the inner surface 4b of the first form element 4. In the shown embodiment, the encoder detects a linear shift of the contact element 29 in a substantially horizontal direction when the first form element is brought in abutment with the outer surface 16a of the previous casting segment 16. The first measuring unit 17 further comprises a spring element 30 which biases the contact element 29 in direction of a first (rest) position, which corresponds to the contact element 29 being out of contact with the upper end of the previous casting segment 16 (see FIG. 8). When arranging the first form element in the casting position (see FIG. 10), the contact element 29 may first contact the upper end of the previous casting segment 16 (see FIG. 9) and may then be displaced backwards from the rest position to a withdrawn position. If there is no gap between the lower end of the first form element 4 and the upper end of the previous casting segment 16, the contact element 16 is arranged in a fully withdrawn position when the first form element 4 is in its casting position. However, if a gap is present between the first form element 4 and the previous casting segment 16, the contact element 29 is arranged in a partially withdrawn position when the first form element 4 reaches the casting position. The position of the contact element 29 is detected by an encoder and communicated to the processing unit 18 for calculating a target tilt of the first form element 4, as explained before. As can be seen from FIG. 15, the pin 29 projects from a sensor housing 31 having a front surface 32 facing the cavity 6. The front surface 32 is set back against the outer surface 4a of the first form element.

Figure 10:
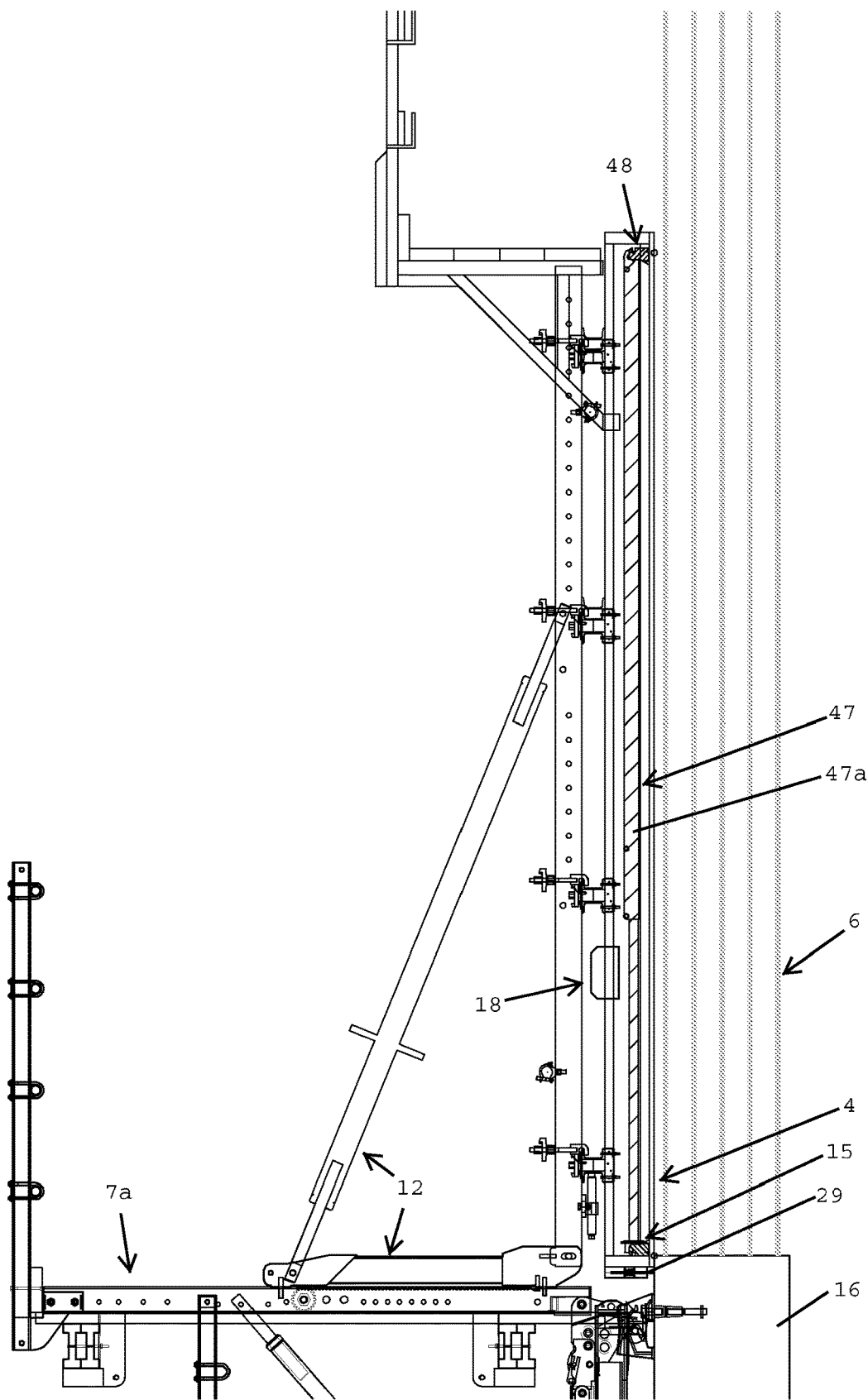
FIG. 10 is a view of the climbing formwork of FIG. 8, 9 in the casting position.
Figure 11:
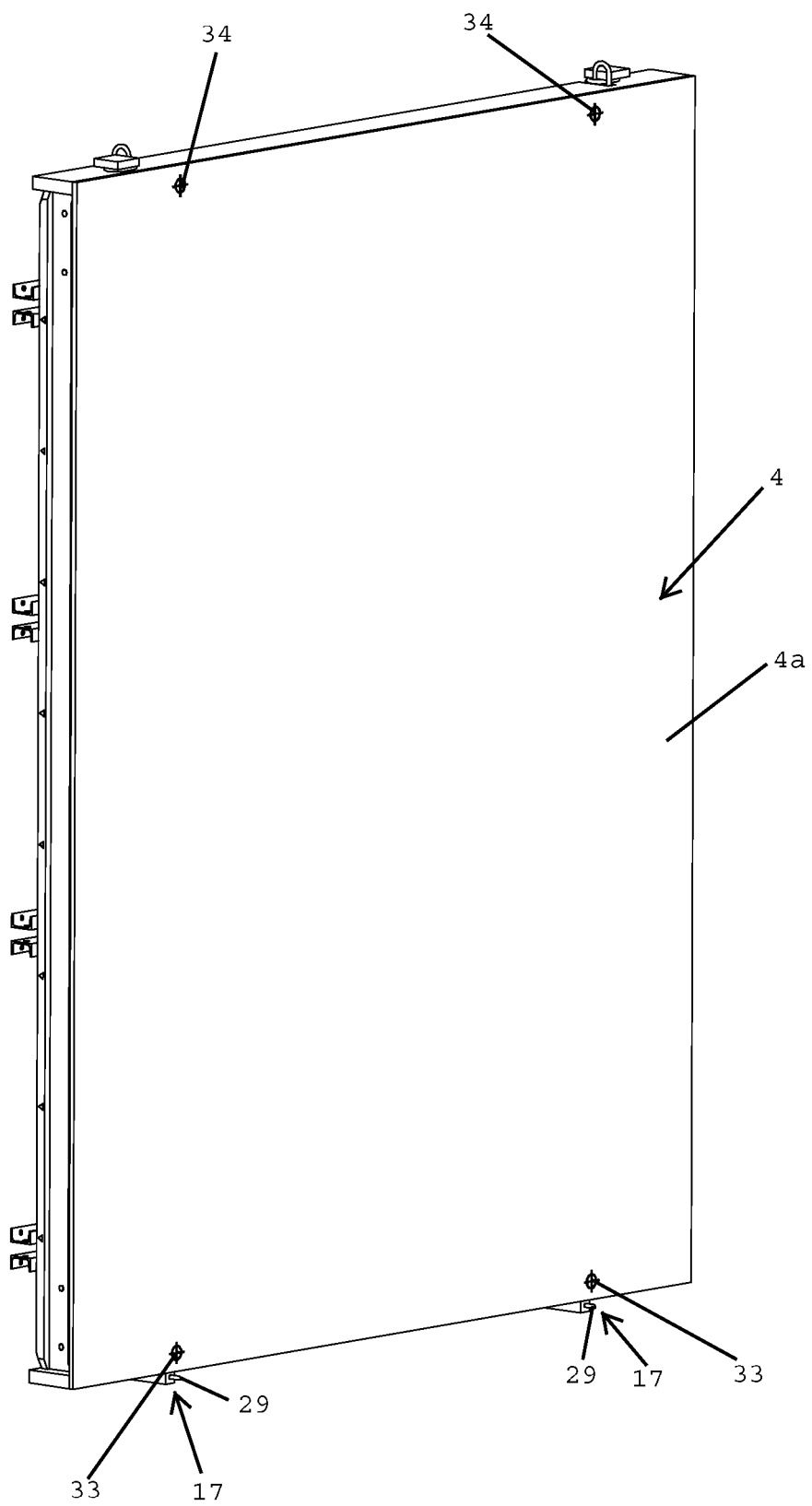
FIG. 11 is a perspective view of the first form element of the climbing formwork of FIGS. 8 to 10.

As can be seen from FIG. 11, at least two first measuring units 17 may be spaced apart in horizontal direction perpendicular to the translational movement of the first form element 4 from the withdrawn position (see FIG. 8) to the casting position (see FIG. 10). The at least two first measuring units 17 may be arranged below positions 33 on first form element 4 (symbolically illustrated in FIG. 11) corresponding to as-built positions of the previous casting segment 16. Likewise, future as-built positions of the casting segment to be cast in the present casting step are illustrated as positions 34 at the upper end of the first form element 4. Of course, the climbing formwork 1 may comprise a multitude of first measuring units 17 and/or tilt sensors 15.

Figure 12:
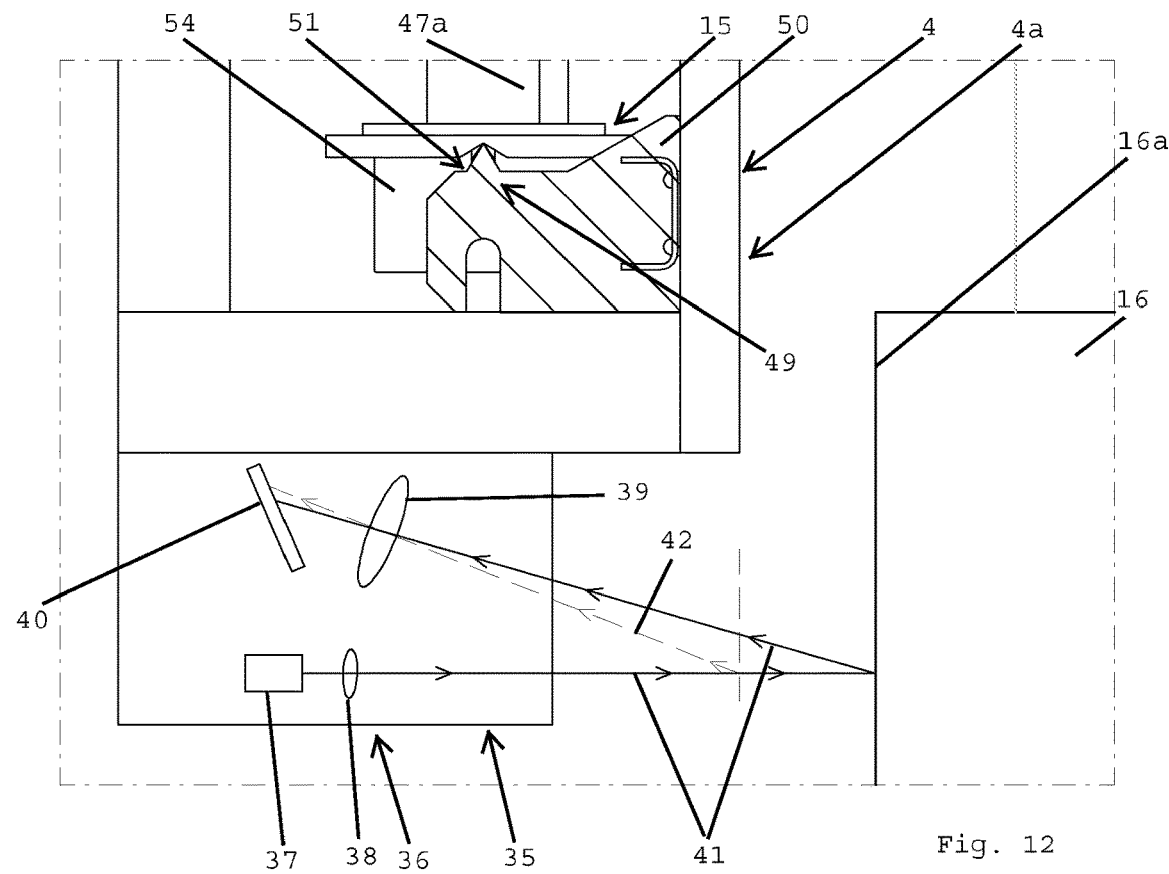
FIG. 12 is an enlarged view of the climbing formwork according to yet another embodiment of the invention.

In the embodiment of FIG. 12, 13, the first measuring unit 17 comprises a wave transmitting and receiving device 35 for determining the horizontal distance between the lower end of the first form element 4 and the upper end of the previous casting segment 16.

According to FIG. 12, the wave transmitting and receiving device 35 is a laser distance sensor 36, which, in the shown embodiment, uses laser triangulation. The laser distance sensor 36 comprises a laser 37, an optional transmitter lens 38, an optional receiver lens 39 and a light receiving element 40. In case of a gap between the first form element 4 and the previous casting segment 16 (as shown in FIG. 12) the laser radiation (illustrated with solid lines 41) hits the light receiving element 40 at a first position, while the laser radiation would hit the light receiving element 40 at a (known) second position if the first form element 4 abuts the previous casting segment 16 (illustrated with dashed lines 42). From the distance between the first and second position the gap between the first form element 4 and the previous casting segment 16 may be calculated.

Figure 13:
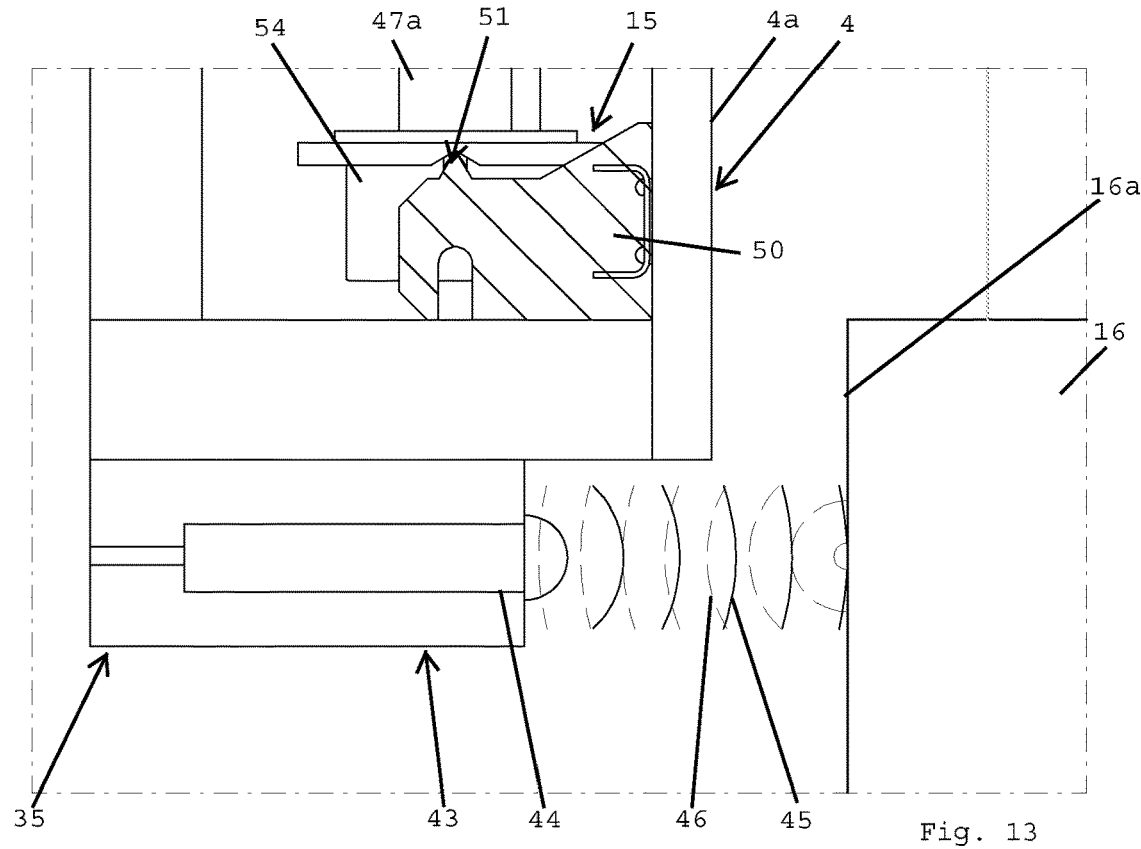
FIG. 13 is an enlarged view of the climbing formwork according to yet another embodiment of the invention.

In the embodiment of FIG. 13, the first measuring unit 17 comprises an ultrasonic wave transmitting and receiving device 43. As is per se known in the prior art, the ultrasonic wave transmitting and receiving device 43 comprises an ultrasonic element 44 for emitting an ultrasonic wave 45 and receiving a reflection 46 of the ultrasonic wave 45. The distance to the target, ie to the outer surface 16a of the previous casting segment 16, is calculated from the time between the emission and reception of the ultrasonic wave 45.

FIGS. 8 to 16 show several embodiments of the tilt sensor 15, which is connected to the processing unit 18 for communicating the present tilt of the first form element 4.

In the variants of FIGS. 8 to 13 and FIGS. 14, 15, respectively, the tilt sensor 15 comprises a longitudinal element 47 mounted on the first form element 4. The longitudinal element 47 extends from the upper end of the first form element 4 to the lower end of the first form element 4. In both variants, the longitudinal element 47 has but two connections to the first form element 4, namely an upper connection 48 at the upper end and a lower connection 49 at the lower end of the first form element 4, respectively.

According to FIGS. 8 to 13, the longitudinal element 47 is a measuring rod 47a. As can be seen from FIGS. 12, 13, the lower connection 49 of the measuring rod 47a comprises a first bracket 50 immovably attached to the first form element 4 at the lower end thereof, the first bracket 50 having a first pivoting support 51 for pivotably supporting the lower end of the measuring rod 48. The upper connection 48 comprises a second bracket 52 immovably attached to the first form element 4 at the upper end thereof, the second bracket 52 having a second pivoting support 53 for pivotably supporting the upper end of the measuring rod 47a. An electronic sensor element 54 (only schematically shown in FIGS. 12, 13) is provided for measuring the inclination of the measuring rod 47a. The electronic sensor element 54 may be arranged at the lower end of the measuring rod 47a.

Figure 14:
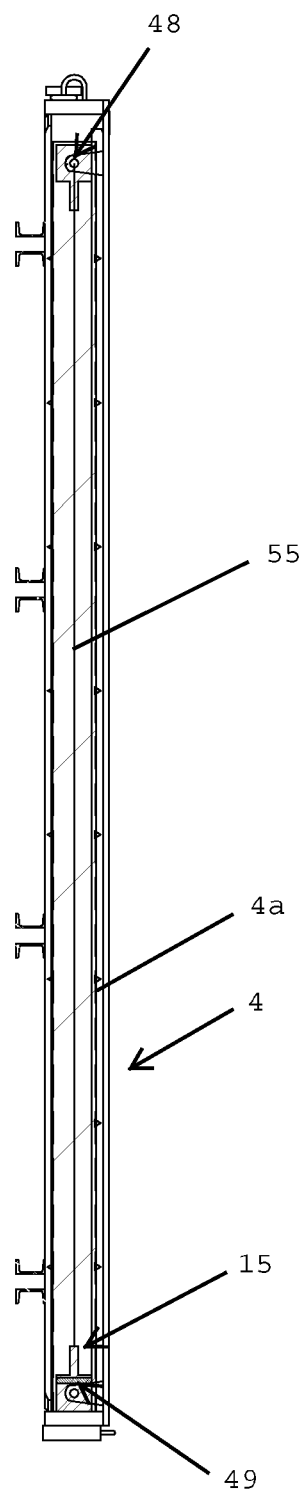
FIG. 14 is a view of the first form element of the climbing formwork according to yet another embodiment of the invention.

FIG. 14 (schematically) and FIG. 15 (in greater detail) illustrates an embodiment of the tilt sensor 15, in which the longitudinal element 47 is a wire or string 55. The tilt sensor 15 further comprises a tensioning device 56 for putting the wire or string 55 under tension. The lower end of the wire or string 55 is fixed to a first mount 57, the upper end of the wire or string 55 is fixed to a second mount 58. In the shown example, the tensioning device 56 is arranged at the second mount 58, but could alternatively be located in the first mount 57. The lower connection 49 comprises the first bracket 50 immovably attached to the first form element 4 at the lower end thereof, the first bracket 50 having the first pivoting support 51. In this embodiment, the first pivoting support 51 is arranged for pivotably supporting the first mount 58 for the lower end of the wire or string 55. The upper connection 48 comprises the second bracket 52 immovably attached to the first form element 4 at the upper end thereof, the second bracket 52 having the second pivoting support 53. In this embodiment, the second pivoting support 53 is arranged for pivotably supporting the second mount 58 for the upper end of the wire or string 55. The electronic sensor element 54 (only schematically shown in FIG. 15) is provided for measuring the inclination of the wire or string 55. The electronic sensor element 54 may be arranged at the first mount 57 for the lower end of the wire or string 55.

Figure 16:
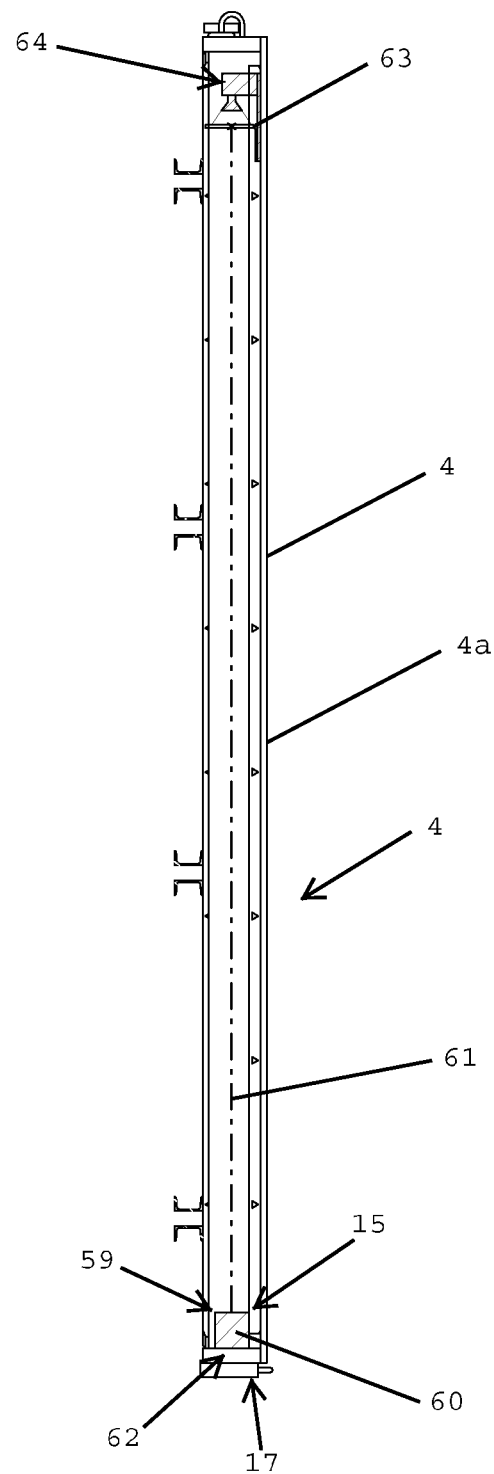
FIG. 16 is a view of the first form element of the climbing formwork according to yet another embodiment of the invention.

In the embodiment shown in FIG. 16, the tilt sensor 15 comprises a laser plummet device 59 with a laser radiation source 60 for emitting a vertical laser beam 61, a self-leveling support 62 (only schematically shown in FIG. 16) for mounting the laser radiation source 61 thereon, a target plate 63 for receiving the vertical laser beam 61 from the laser radiation source 60 and a camera unit 64 for detecting a displacement of an intersection of the vertical laser beam 61 with the target plate with respect to a reference point of the target plate 63. The laser radiation source 61 is mounted on the lower end of the first form element 4 via the self-leveling support 62, which ensures that the laser beam 61 is vertical independent of the inclination of the first form element 4. The target plate 63 and the camera unit 64 are attached to the upper end of the first form element 4. In use, the tilting of the first form element 4 results in a horizontal displacement of the position of the laser beam 61 on the target plate 63 with respect to the reference point on the target plate 63. From this horizontal displacement the processing unit 18 may calculate the actual tilt of the first form element 4.

The self-leveling support 62 may be connected to a dampening device for dampening vibrations of the self-leveling support 62 (not shown).

The invention claimed is:

1. A climbing formwork for erection of a concrete structure by successively casting a plurality of casting segments, the climbing formwork comprising:
at least a first form element with an outer surface for delimiting a cavity to receive concrete for forming an uppermost casting segment, the first form element having an upper end and a lower end,
a first support structure to support the first form element,
a first tilt sensor for measuring a tilt of the first form element,
a first measuring unit for measuring a horizontal distance between the outer surface at the lower end of the first form element and an outer surface at an upper end of a previous casting segment, the outer surface at the upper end of the previous casting segment facing the outer surface of the first form element and
a processing unit communicating with the first tilt sensor and the first measuring unit, the processing unit being arranged for calculating a target tilt of the first form element using the measurement of the horizontal distance between the lower end of the outer surface of the first form element and the upper end of the outer surface of the previous casting segment, the processing unit further being arranged for determining a deviation between an actual tilt and the target tilt of the first form element.

2. The climbing formwork according to claim 1, wherein the first measuring unit is arranged at the lower end of the first form element, wherein at least two first measuring units are arranged in a distance from one another in a horizontal direction transverse to a translational displacement of the first form element into a casting position.

3. The climbing formwork according to claim 1, wherein the first measuring unit comprises a contact element moveable relative to the first form element from a first position into a second position when the first form element is moved into a casting position.

4. The climbing formwork according to claim 3, wherein the first measuring unit comprises a spring element which biases the contact element in a direction of the first position.

5. The climbing formwork according to claim 1, wherein the first measuring unit comprises a sensor housing having a front surface facing a cavity, the front surface being set back against the outer surface of the first form element.

6. The climbing formwork according to claim 1, wherein the first tilt sensor comprises a longitudinal element mounted on the first form element, the longitudinal element extending from the upper end of the first form element to the lower end of the first form element, the longitudinal element being connected to the first form element at the upper end and at the lower end of the first form element, respectively.

7. The climbing formwork according to claim 6, wherein the longitudinal element is connected to the first form element via a first pivoting support at the lower end of the first form element and a second pivoting support at the upper end of the first form element.

8. The climbing formwork according to claim 1, wherein the processing unit is connected to a data storage unit storing a correction value for a position of the first form element, the correction value being derived from a deviation between a position of the previous casting segment from a reference position of the previous casting segment, the processing unit being arranged for calculating the target tilt of the first form element using the correction value for the position of the first form element in addition to the horizontal distance between the lower end of the outer surface of the first form element and the upper end of the outer surface of the previous casting segment.

9. The climbing formwork according to claim 1, wherein the processing unit is connected to at least one of a displaying device for displaying the deviation between the target tilt and the actual tilt of the first form element, and a signaling device for signaling the deviation between the target tilt and the actual tilt of the first form element.

10. The climbing formwork according to claim 1, wherein a drive unit for adjusting the first form element relative to the first support structure, the drive unit comprising a first tilting unit for tilting the first form element and/or a first horizontal displacement unit for horizontally displacing the first form element and/or a first vertical displacement unit for vertically displacing the first form element.

11. The climbing formwork according to claim 10, wherein the processing unit is connected to the first tilting unit for tilting the first form element in accordance with the target tilt.

12. A method for erecting a concrete structure by successively casting a plurality of concrete segments, comprising the steps of:
- arranging a climbing formwork having at least a first form element with an outer surface in a casting position, wherein the first form element delimits a cavity to receive concrete for forming an uppermost casting segment,
- supporting the first form element in the casting position,
- measuring an actual tilt of the first form element,
- measuring a horizontal distance between a lower end of the outer surface of the first form element and an upper end of an outer surface of a previous casting segment, the outer surface of the upper end of the previous casting segment facing the outer surface of the first form element,
- calculating a target tilt of the first form element using the measurement of the horizontal distance between the lower end of the outer surface of the first form element and the upper end of the outer surface of the previous casting segment, and
- determining a deviation between the actual tilt and the target tilt of the first form element.

13. The climbing formwork according to claim 3, wherein the contact element is a pin.

14. The climbing formwork according to claim 6, wherein the longitudinal element is a measuring rod or a wire or string.

* * * * *